United States Patent [19]

Danielsson

[11] Patent Number: 4,844,419
[45] Date of Patent: Jul. 4, 1989

[54] CABLE CARRIER

[75] Inventor: Ingvar Danielsson, Kungsbacka, Sweden

[73] Assignee: Thorsman & Co. Aktiebolag, Nykuping, Sweden

[21] Appl. No.: 68,219

[22] PCT Filed: Oct. 9, 1986

[86] PCT No.: PCT/SE86/00465

§ 371 Date: May 22, 1987

§ 102(e) Date: May 22, 1987

[87] PCT Pub. No.: WO87/02521

PCT Pub. Date: Apr. 23, 1987

[30] Foreign Application Priority Data

Oct. 9, 1985 [SE] Sweden ................................ 8504679

[51] Int. Cl.[4] .......................................... B65H 59/00
[52] U.S. Cl. ........................................ 254/134.3 PA
[58] Field of Search .............. 254/389, 390, 393, 394, 254/395, 397, 400, 401, 134.3 PA, 134.3 FT, 134.3 R

[56] References Cited

U.S. PATENT DOCUMENTS

| 743,656 | 11/1903 | Nettles et al. | 254/134.3 R |
| 4,013,269 | 3/1977 | Lovett | 254/134.3 PA |

FOREIGN PATENT DOCUMENTS

| 495662 | 5/1950 | Belgium | 254/134.3 PA |
| 915151 | 3/1982 | U.S.S.R. | 254/134.3 R |
| 970528 | 10/1982 | U.S.S.R. | 254/134.3 R |

Primary Examiner—Robert C. Watson
Attorney, Agent, or Firm—Roberts, Spiecens & Cohen

[57] ABSTRACT

A cable carrier (1) for mounting power cable or lines (3) on support insulators (2). The carrier (1) comprises a gripping device having two legs (4, 5) each of which carries a respective roller (12, 13), such that when the carrier is mounted in position the rollers are located on a respective side of the insulator and extend transversely to the cable (3). The rollers are inclined so that in projection the roller axes intersect one another at a point located above the support insulator (2). The cable carrier (1) is constructed so that the cable (3), subsequent to being run or drawn, can be transferred to the insulator without needing to be lifted away while removing the cable carrier (1). This is effected by rotating the carrier, so as to cause the cable (3) to slide along the inclined rollers (12, 13) and down onto the insulator. The gripping device is then opened and the carrier removed, by displacing the carrier laterally in relation to the insulator.

5 Claims, 2 Drawing Sheets

CABLE CARRIER

FIELD OF THE INVENTION

The present invention relates to a cable carrier for use when fitting power cables or lines to support insulators, the carrier being constructed in a manner which will enable it to be firmly attached to the neck of an insulator with the aid of a gripping device that comprises two legs on which respective gripping members, preferably arcuate gripping members, are mounted.

BACKGROUND AND PRIOR ART

When running overhead cables or like power lines with the aid of known cable carriers mounted on support insulators, the cable will be spaced from the insulator when the cable is tensioned at the end of a cable run. This means that the cable must be transferred or carried-over from the cable carrier to the support insulator, in some way or another. This work is normally carried by a linesman, who climbs the pole or post carrying the cables and is there forced to carry out the relatively heavy task of shifting the cable while in a relatively uncomfortable working position. For example, it is normally necessary for the linesman to lift the cable manually from the cable carrier and place the cable on an attachment bolt or like support for the insulator and then, subsequent to dismantling the cable carrier, to lift the cable from the attachment bolt or like support onto the insulator. This task requires the cable to be lifted some considerable distance out from the post, which is an extremely heavy task to perform and which subjects the spine of the linesman to excessive and harmful strain. Various kinds of lifting devices have been proposed with the view of safeguarding the linesman in this latter regard. These lifting devices, however, are in themselves troublesome and difficult to handle, and at times require the use of two men to transfer a cable from the cable carrier to the insulator.

SUMMARY OF THE INVENTION

The object of the present invention is to facilitate the work of the linesman, by eliminating the need to lift the cable from the cable carrier to the insulator, either with or without the aid of a lifting device. This object is achieved by providing each leg of the aforesaid cable carrier with a roller the axis of which is so inclined in relation to the leg that the axes of the two rollers intersect one another above the insulator when the cable carrier is fitted, thereby centralizing a cable drawn over the rollers in relation to the top part of the support insulator. When running or drrawing a cable, the cable carrier is initially positioned so that the rollers extend transversely to the cable and, subsequent to running the cable, is loosened slightly from the insulator and rotated around the insulator in a direction such that the cable will glide down onto the underlying insulator, along the peripheral surfaces of the inclined rollers, so as finally to slide off the rollers and onto the insulator. The cable carrier can now be loosened completely and removed and the cable secured to the insulator, without the assistance of a cable lifting device.

BRIEF DESCRIPTION OF THE DRAWINGS

The invention will now be described in more detail with reference to the accompanying drawings, in which.

DESCRIPTION OF A PREFERRED EMBODIMENT

Figure 1:
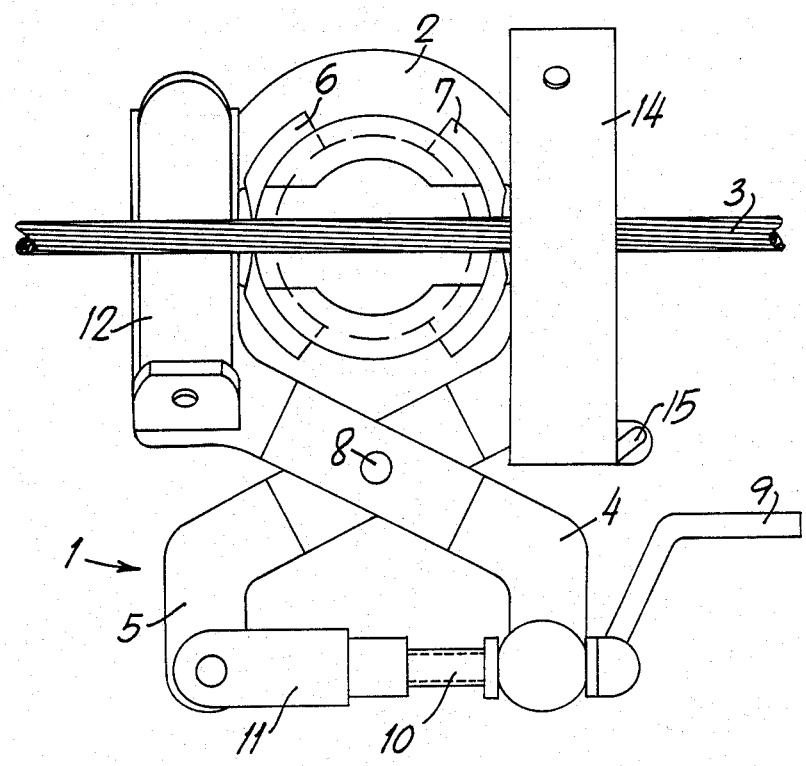
FIG. 1 illustrates a cable carrier, according to the invention, in plan view.

FIG. 1 is a plan view of a cable carrier 1 mounted on a support insulator 2, and while illustrates a cable or line 3 that has been drawn or run over the cable carrier. The cable carrier 1 is basically a gripping device which, in the illustrated embodiment, has a scissorlike configuration, i.e. it comprises two legs 4, 5 which are held together at their mutual point of intersection by means of a rivet 8. Each of the legs has mounted thereon a respective arcuate gripping member 6, 7 which is covered with a layer of resilient material, said gripping members being intended to grip around the neck part of the insulator 2. In the illustrated embodiment, the end of the leg 4 remote from the gripping device 6 has journalled therein a spindle 10 which has a turning handle 9 attached to one end thereof, whereas the mutually adjacent end of the leg 5 has connected thereto a nut-link 11 which co-acts with the spindle 10 in a manner which enables the gripping device to be tightened around or slackened from the insulator, by appropriate rotation of the handle 9.

Figure 2:
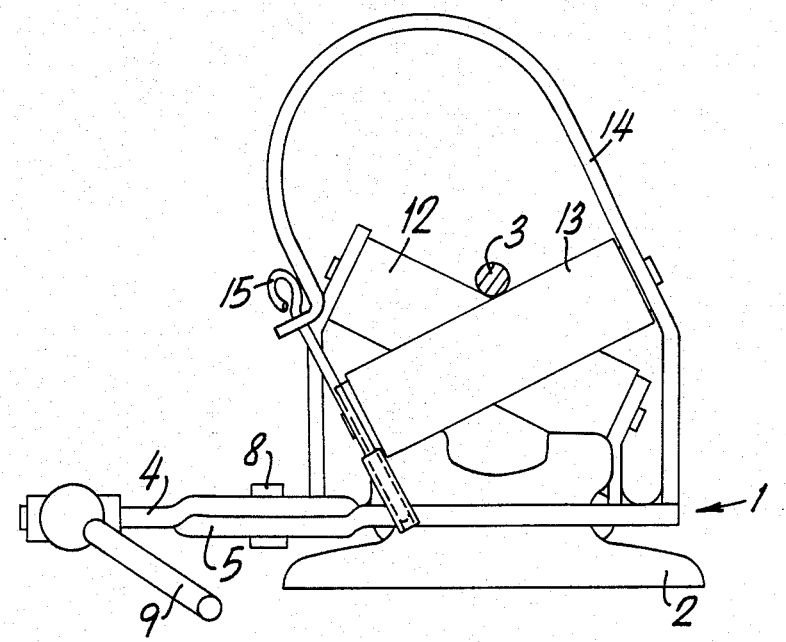
FIG. 2 is a side view of the cable carrier illustrated in FIG. 1.
Figure 3:
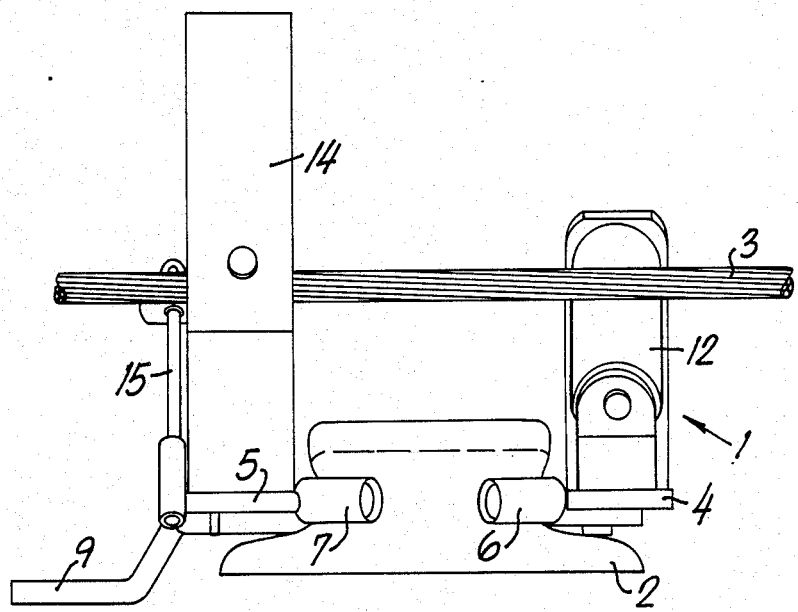
FIG. 3 is a view of the cable carrier taken from the rear.

As will be seen from FIG. 2, the parts of the legs 4, 5 that embrace the insulator have mounted thereon rollers 12, 13, the axes of which are inclined relative to the legs, such that in projection the axes will intersect at a point located above the insulator 2, thereby centralizing the cable 3 in relation to the top part of the support insulator. A stirrup-like device 14 is arranged above one of the rollers, so as to prevent the cable from jumping out of the cable carrier. The device 14 can be opened by removing a pin 15 located at the lowermost end of the inclined roller 13.

The strirrup-like 14 is opened when the cable 3 is to be transferred to the insuluator 2. This is effected by turning the spindle 10 by means of the handle 9, so as to slacken the grip of the cable carrier on the insulator, and then by rotating the cable carrier counterclockwise on the insulator, this rotation being readily accomplished due to the pressure exerted by the cable on the inclined rollers. Further rotation of the carrier causes the cable to slide completely off the rollers and down onto the insulator. The spindle 10 is now rotated by the handle 9 until the gripping members 6, 7 are fully parted and totally free from the insulator 2, whereupon the cable carrier can be removed completely from the insulator, by moving the carrier in the direction of the cable. Transference of the cable 3 from the cable carrier 1 to the support insulator 2 has therewith been accomplished without needing to lift the cable in so doing.

It will be understood that the cable carrier can be given other forms without departing from the concept of the invention. For example, the gripping device need not have a scissor-like configuration but may instead comprise mutually parallel legs, at least one of which can be mounted for axial displacement on a rail intended herefor. One condition, however, is that the gripping device can be opened so as to enable the carrier to be removed laterally from the insulator without needing to lift the cable. Furthermore, in certain kinds of cable drawing or running operations carried out in undulating terrain and with the use of so-called nylon leader lines, it may be more suitable to provide both rollers with overlying stirrup-like devices 14.

What is claimed is:

1. A cable carrier for mounting power cables on support insulators and which can be clamped firmly to the neck part of an insulator by means of a gripping device comprising two legs which have gripping members arranged thereon, the cable carrier comprising two rollers one on each of the legs, the rollers being spaced apart and inclined relative to the legs in opposite directions of inclination such that when the carrier is mounted in position, the projections of the axes of the two oppositely inclined rollers will intersect one another of a point above the support insulator thereby supporting a cable drawn over the rollers in spaced, centralized relation above the top part of the support insulator and means for loosening said gripping device on the neck part of the insulator to permit the carrier to be rotated around the neck part of the support insulator while the cable is lowered on the inclined rollers until the cable comes free of the rollers and is deposited on the insulator whereupon the cable carrier is free for removal from the insulator.

2. A cable carrier as claimed in claim 1 wherein said gripping members are arcuate in shape.

3. A cable carrier as claimed in claim 1 wherein said legs of the gripping device are connected together as a scissors linkage and said means for loosening said gripping device comprises an actuator handle for opening the scissors linkage.

4. A cable carrier as claimed in claim 3 wherein said means for loosening said gripping device comprises a threaded connection between said legs which separates said gripping members from said neck part upon operation of the actuator handle.

5. A cable carrier as claimed in claim 1 wherein said legs are disposed in a common plane and said rollers are supported on said legs to extend thereabove in inclined relation.

* * * * *